(12) United States Patent
Kominato

(10) Patent No.: US 11,046,263 B2
(45) Date of Patent: Jun. 29, 2021

(54) COMMUNICATION SYSTEM AND SEAT UNIT

(71) Applicant: YAZAKI CORPORATION, Tokyo (JP)

(72) Inventor: Yasuhiro Kominato, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/852,695

(22) Filed: Apr. 20, 2020

(65) Prior Publication Data
US 2020/0369225 A1 Nov. 26, 2020

(30) Foreign Application Priority Data

May 23, 2019 (JP) .............................. JP2019-096840

(51) Int. Cl.
| | | |
|---|---|---|
| *H04B 10/00* | (2013.01) | |
| *B60R 16/023* | (2006.01) | |
| *H04W 4/48* | (2018.01) | |
| *B60N 2/02* | (2006.01) | |
| *H04B 10/114* | (2013.01) | |
| *H04J 14/00* | (2006.01) | |

(52) U.S. Cl.
CPC .......... *B60R 16/023* (2013.01); *B60N 2/0244* (2013.01); *H04B 10/1143* (2013.01); *H04W 4/48* (2018.02)

(58) Field of Classification Search
CPC ... H04B 10/11; H04B 10/114; H04B 10/1141; H04B 10/1143; B60R 2022/4808; B60R 2022/4816; B60R 2022/4858; B60R 2022/4866; B60R 2022/4883; B60R 2022/4891; B60R 22/48; B60R 16/00; B60R 16/023; B60R 16/027
See application file for complete search history.

(56) References Cited

U.S. PATENT DOCUMENTS

| | | | | |
|---|---|---|---|---|
| 2007/0096891 A1* | 5/2007 | Sheriff | .............. | B60R 21/01556 340/457.1 |
| 2010/0253498 A1* | 10/2010 | Rork | ...................... | B60N 2/002 340/457.1 |
| 2014/0206302 A1 | 7/2014 | Terada | | |

FOREIGN PATENT DOCUMENTS

| | | |
|---|---|---|
| GB | 2 433 384 A | 6/2007 |
| JP | 2013-67322 A | 4/2013 |

\* cited by examiner

*Primary Examiner* — Daniel G Dobson
(74) *Attorney, Agent, or Firm* — Sughrue Mion, PLLC

(57) ABSTRACT

A communication system includes a seat unit mounted on a seat of a vehicle and operating by an electrical power supplied from a battery, and a vehicle unit that wirelessly communicates with the seat unit, and transmits a start command. The seat unit receives the start command in a standby state in which a power consumption is lower than a normal state, and then the seat unit switches from the standby state to the normal state. After that, the seat unit transmits an information on an electronic device mounted on the seat, in the normal state. According to the communication system, the seat unit switches from the standby state to the normal state, only when the vehicle unit transmits the start command. Therefore, battery life can be extended.

7 Claims, 10 Drawing Sheets

COMMUNICATION SYSTEM AND SEAT UNIT

CROSS-REFERENCE TO RELATED APPLICATIONS

This application is based on and claims priority under 35 USC 119 from Japanese Patent Application No. 2019-096840 filed on May 23, 2019, the contents of which are incorporated herein by reference.

TECHNICAL FIELD

The present disclosure relates to a communication system and a seat unit. The communication system includes the seat unit that is mounted on a seat of a vehicle and that operates in response to power supply from a battery, and a vehicle unit that wirelessly communicates with the seat unit.

BACKGROUND ART

As a communication system described above, a signal receiving device described in JP2013-067322A has been proposed. The signal receiving device performs infrared communication between a slide seat and a vehicle, and uses a battery as a power source of a slide seat, so that routing of wire harness between the slide seat and the vehicle is avoided.

However, according to the signal receiving device described above, communication between the slide seat and the vehicle is being performed even when communication with the slide seat is not required. For this reason, there is a problem that battery exhaustion occurs quickly.

SUMMARY OF INVENTION

The present disclosure is to provide a communication system capable of extending battery life and a seat unit.

According to a first illustrative aspect of the present disclosure, a communication system includes a seat unit that is mounted on a seat of a vehicle and is configured to operate in response to an electrical power supplied from a battery, and a vehicle unit that wirelessly communicates with the seat unit. The vehicle unit transmits a start command. And, the seat unit receives the start command in a standby state, the standby state being a state in which a power consumption is lower than a normal state, the normal state being a state in which the power consumption is higher than the standby state. The seat unit switches from the standby state to the normal state, and transmits an information on an electronic device mounted on the seat, in the normal state.

According to a second illustrative aspect of the present disclosure, the seat unit switches to the standby state after transmitting the information on the electronic device.

According to a third illustrative aspect of the present disclosure, the seat unit determines whether the information on the electronic device changes in the standby state. The seat unit switches to the normal state and transmits the information on the electronic device, when the seat unit determines that the information on the electronic device changes.

According to a fourth illustrative aspect of the present disclosure, the seat unit determines whether the information on the electronic device changes in the normal state. The seat unit transmits the information on the electronic device when the seat unit determines that the information on the electronic device changes.

According to a fifth illustrative aspect of the present disclosure, the vehicle unit transmits the start command, depending on whether an ignition turns on from an off-state of the ignition or turns off from an on-state of the ignition.

According to a sixth illustrative aspect of the present disclosure, the seat unit and the vehicle unit wirelessly communicates with each other, such that an optical pulse signal is transmitted and received. The vehicle unit transmits a change command for which an output of the optical pulse signal is adjusted, when the vehicle unit determines that an amplitude or a rising of the optical pulse signal received from the seat unit varies includes a dispersion of the amplitude or the rising. And, the seat unit changes the output of the optical pulse signal and retransmits the changed optical pulse signal, when receiving the change command from the vehicle unit after transmitting the optical pulse signal.

According to a seventh illustrative aspect of the present disclosure, a seat unit is mounted on a seat of a vehicle, is configured to operate in response to an electrical power supplied from a battery, and wirelessly communicates with a vehicle unit. And, the seat unit receives a start command in a standby state, the standby state being a state in which a power consumption is lower than a normal state, the normal state being a state in which the power consumption is higher than the standby state. The seat unit switches from the standby state to the normal state, and transmits an information on an electronic device mounted on the seat, in the normal state.

According to the first, fifth and seventh illustrative aspects, only when the start command is transmitted by the vehicle unit, the seat unit switches from the standby state to the normal state and transmits the information on the electronic device mounted on the seat. Accordingly, battery life can be extended.

According to the second illustrative aspect, the seat unit switches to the standby state after transmitting the information on the electronic device. Accordingly, the battery life can be further extended.

According to the third and fourth illustrative aspects, the seat unit transmits the information on the electronic device only when the information on the electronic device changes. Accordingly, it is possible to transmit necessary information to the vehicle unit while extending the battery life.

According to the sixth illustrative aspect, when it is determined that the amplitude or the rising of the optical pulse signal from the seat unit varies, the vehicle unit causes the output of the optical pulse signal to be changed. Accordingly, it is possible to reduce the influence from disturbance light and from foreign matters adhered to a light emitting element, thereby preventing a decrease in communication performance.

According to the present disclosure, it is possible to provide a communication system capable of extending battery life and a seat unit.

The present disclosure is briefly described as above. Further, details of the present disclosure will be clarified by reading a mode for carrying out the present disclosure (hereinafter, referred to as "embodiments") described below with reference to the accompanying drawings.

DESCRIPTION OF EMBODIMENTS

Specific embodiments of the present disclosure will be described below with reference to the drawings.

First Embodiment

Figure 1:
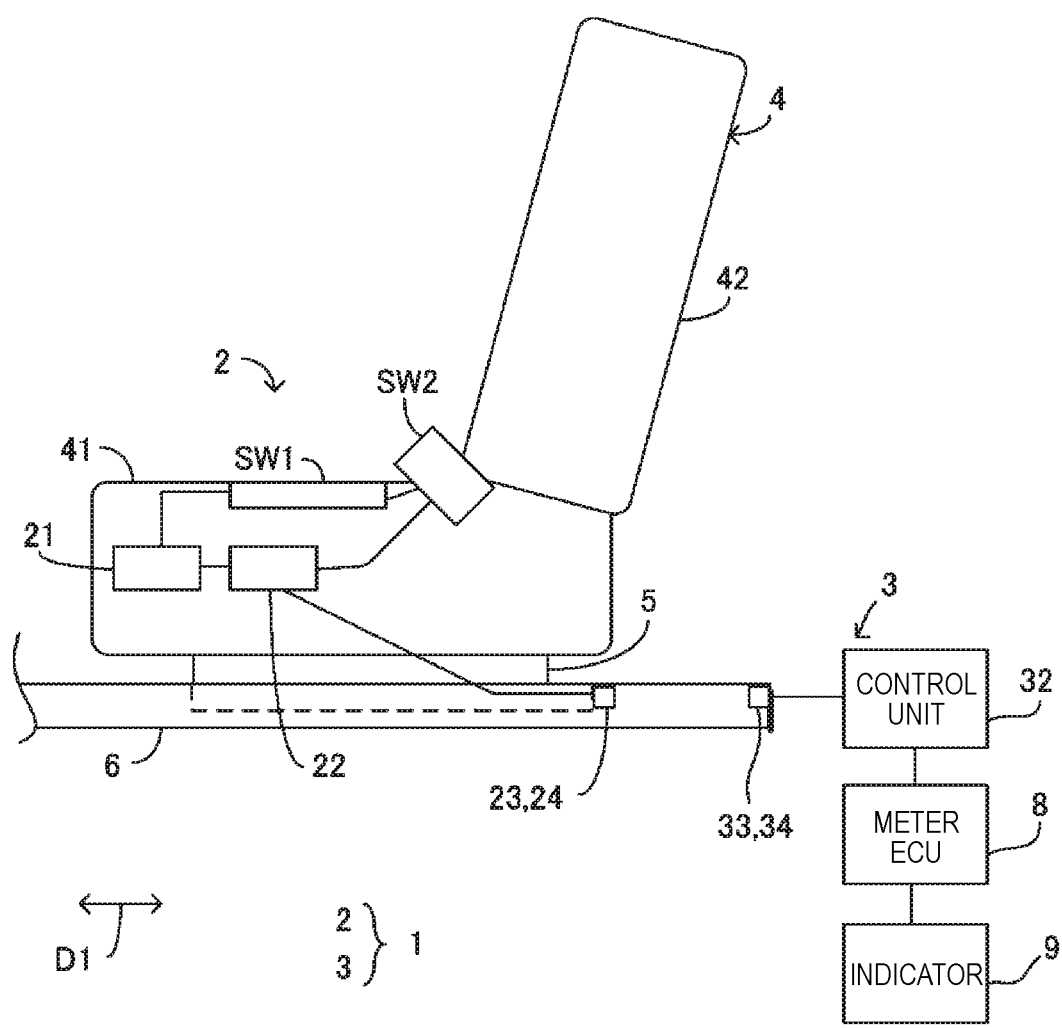
FIG. 1 is a configuration diagram illustrating an embodiment of a communication system of the present disclosure.

As illustrated in FIG. 1, the communication system 1 according to the first embodiment includes a seat unit 2 provided on a slide seat (seat) 4, and a vehicle unit 3 provided on a vehicle (vehicle body). The communication system 1 is a system capable of performing bidirectional optical wireless communication between the seat unit 2 and the vehicle unit 3.

The slide seat 4 is mounted on the vehicle and mainly includes a seat cushion 41 and a seat back 42. With an upper rail 5 attached to a lower surface of the seat cushion 41, and with a rail 6 that is disposed below the seat cushion 41 and to which the upper rail 5 is slidably attached, the slide seat 4 is slidable along a front-rear direction D1 of the vehicle.

The seat unit 2 operates depending on a battery 21. In the present embodiment, the battery 21 is configured with a primary battery that cannot be charged, and is, for example, a battery that needs to be regularly replaced at the time of vehicle inspection.

The seat unit 2 includes the battery 21, a seating switch SW1, a buckle switch SW2, a control unit 22, a light emitting unit 23, and a light receiving unit 24. The seating switch SW1 is one of electronic devices mounted on the slide seat 4. The seating switch SW2 is, for example, disposed in the seat cushion 41, is pressed to be turned ON when an occupant sits on the slide seat 4, and is turned OFF when the occupant gets out of the slide seat 4. Seating of the occupant can be detected based on an ON and OFF state of the seating switch SW2.

The buckle switch SW2 is one of the electronic devices mounted on the slide seat 4. The buckle switch SW2 is provided in a buckle of a seat belt, is turned ON when a tongue is inserted into the buckle of the seat belt, and is turned OFF when the tongue is pulled out. Seat belt wearing of the occupant can be detected based on an ON and OFF state of the buckle switch SW2.

Figure 2:
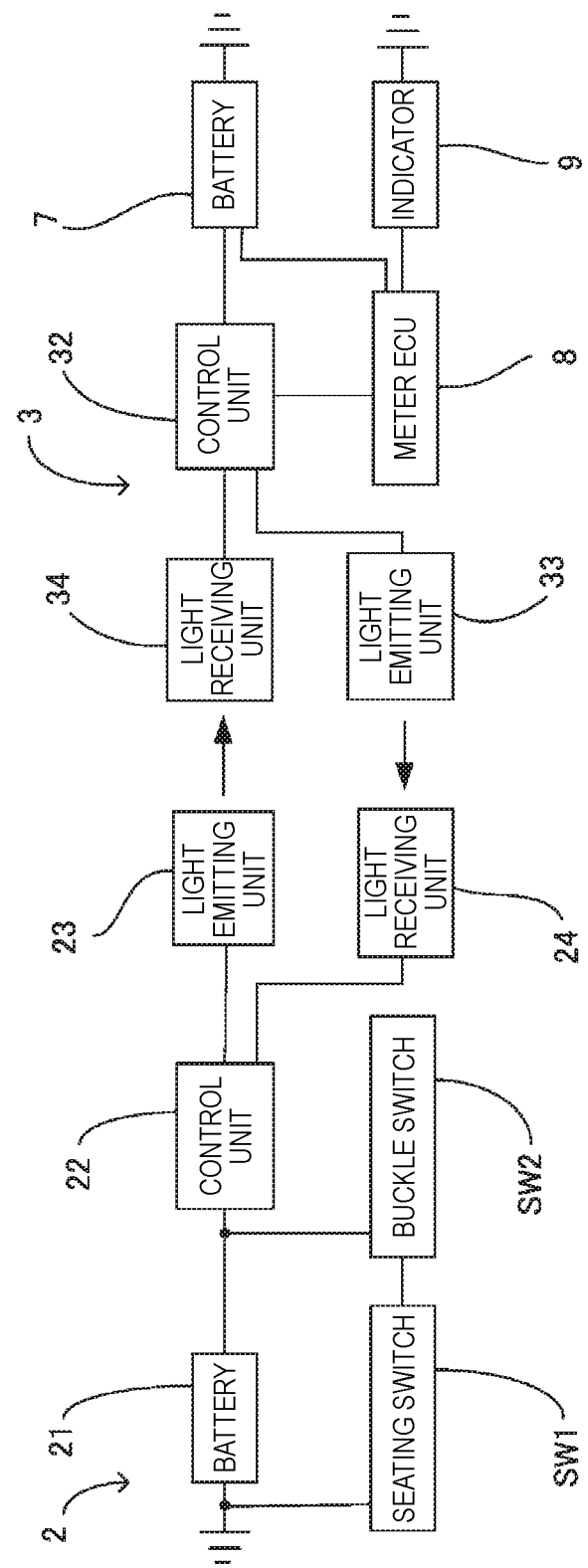
FIG. 2 is an electrical configuration diagram illustrating the communication system illustrated in FIG. 1.

In the present embodiment, as illustrated in FIG. 2, the seating switch SW1 and the buckle switch SW2 are connected in series, and a Lo level signal is input to an input terminal of the control unit 22, which will be described below, only when both of the switches SW1 and SW2 are turned on. On the other hand, when either one of the switches SW1 and SW2 is OFF, a. Hi level signal is input to the input terminal of the control unit 22, The Hi level signal is a signal generated based on a power supply voltage from the battery 21.

In the present embodiment, the seating switch SW1 and the buckle switch SW2 are described as examples of the electronic devices mounted on the slide seat 4, and the present disclosure is not limited thereto. For example, various sensors provided in the slide seat 4 may be the electronic devices.

The control unit 22 is configured with a microcomputer, and is constantly supplied with power from the battery 21. The control unit 22 performs optical wireless communication, by controlling the light emitting unit 23 and the light receiving unit 24 to transmit and receive an optical pulse signal to and from the vehicle unit 3, which will be described below. The light emitting unit 23 is configured with a light emitting diode, and transmits an optical pulse signal by flashing. The light receiving unit 24 is configured with a photodiode, and receives an optical pulse signal from the light emitting unit 23 of the vehicle unit 3, which will be described below. As illustrated in FIG. 1, the light emitting unit 23 and the light receiving unit 24 are attached to the upper rail 5.

In the present embodiment, the control unit 22 acquires ON and OFF information on the switches SW1 and SW2 based on signals from the seating switch SW1 and the buckle switch SW2, controls the light emitting unit 23, and outputs an optical pulse signal indicating the acquired ON and OFF information. The control unit 22 can switch between a standby state and a normal state. The standby state is a state in which power consumption can be kept low by lowering a processing speed (delaying a clock). The normal state is a state in which the processing speed can be raised (the clock is quickened) while the power consumption is increased.

Upon receiving a start signal (start command) from the vehicle unit 3 during the standby state, the control unit 22 switches to the normal state and transmits the ON and OFF information on the seating switch SW1 and the buckle switch SW2.

The vehicle unit 3 is disposed, for example, on an instrument panel of the vehicle, and operates in response to power supply from a battery 7. The battery 7 is configured with a secondary battery and is charged by an alternator. The vehicle unit 3 includes a control unit 32, a light emitting unit 33, and a light receiving unit 34.

The control unit 32 is configured with a microcomputer. The control unit 32 performs optical wireless communication, by controlling the light emitting unit 33 and the light receiving unit 34 to transmit and receive an optical pulse signal to and from the seat unit 2. The light emitting unit 33 is configured with a light emitting diode, and outputs an optical pulse signal by flashing. The light receiving unit 34 is configured with a photodiode, and receives an optical pulse signal from the light emitting unit 23 of the seat unit 2. The light emitting unit 33 and the light receiving unit 34 are attached to the rail 6, and are disposed to face the light emitting unit 23 and the light receiving unit 24 of the seat unit 2 in the front-rear direction D1.

Figure 3:
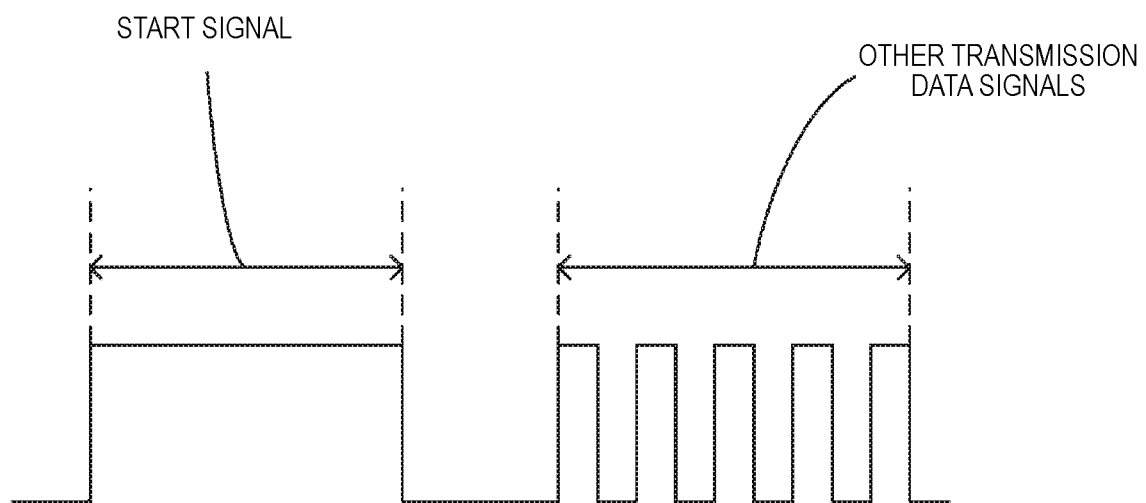
FIG. 3 is a time chart illustrating a start signal and other transmission data signals.

When an ignition (IG) is turned ON from being OFF, the control unit 32 controls the light emitting unit 33 to output an optical pulse signal indicating a start signal. In the present embodiment, as illustrated in FIG. 3, the start signal is one pulse signal having a period longer than that of an optical pulse signal, other than the start signal, indicating transmission data (ON and OFF information or the like).

As illustrated in FIG. 2, the control unit 32 communicates with a meter ECU 8, and the meter ECU 8 controls an indicator 9 in accordance with a command from the control unit 32. The indicator 9 includes a seat belt wearing warning lamp (not illustrated), lighting of which is controlled by the meter ECU 8, and an inspection lamp (not illustrated) of the seat unit 2.

Next, operations of the communication system 1 having the configuration described above will be described with reference to FIGS. 4 and 5. First, when an IG switch is switched from off to on, the control unit 32 of the vehicle unit 3 (hereinafter, also abbreviated as "vehicle unit 3") performs processing illustrated in FIG. 4. First, the vehicle unit 3 transmits a start signal to the seat unit 2 (step S1). Thereafter, if the IG switch is ON (N in step S2), the vehicle unit 3 performs regular communication to transmit an ON and OFF information transmission command to the seat unit 2 (step S3). In step S3, the vehicle unit 3 adjusts time so as to perform regular communication at an interval of, for example, 1 second.

Next, the vehicle unit 3 determines whether there is a reply (ON and OFF information) in response to the transmission command (step S4), If there is no reply from the seat unit 2 (N in step S4), the vehicle unit 3 determines that there is a failure such as battery exhaustion of the seat unit 2, commands the meter ECU 8 to turn on the inspection lamp (step S5), and returns to step S2. The meter ECU 8 controls the indicator 9 in accordance with the command from the vehicle unit 3 to turn on the inspection lamp.

Meanwhile, if there is a reply from the seat unit 2 (Y in step S4), the vehicle unit 3 performs determination of the replied ON and OFF information (step SC). If it is determined as a result that the information indicates both of the switches SW1 and SW2 are turned on (Y in step SC), the vehicle unit 3 determines that an occupant seated on the slide seat 4 is wearing a seat belt, commands the meter ECU 8 to turn off a warning lamp (step S7), and returns to step S2. The meter ECU 8 controls the indicator 9 in accordance with the command from the vehicle unit 3 to turn off the warning lamp.

If it is determined as a result that the information indicates that either one of the switches SW1 and SW is off (N in step SC), the vehicle unit 3 determines that the occupant seated on the slide seat 4 is not wearing the seat belt, and then determines whether a vehicle speed is equal to or greater than a predetermined speed (for example, 20 km/h) (step S8). If the vehicle speed is less than 20 km/h (N in step S8), the vehicle unit 3 determines that there is no problem even if the seat belt is not worn and commands the meter ECU 8 to turn off the warning lamp (step S9), and returns to step S2. The meter ECU 8 controls the indicator 9 in accordance with the command from the vehicle unit 3 to turn off the warning lamp.

If the vehicle speed is equal to or greater than 20 km/h (Y in step S8), the vehicle unit 3 commands the meter ECU 8 to flash the warning lamp (step S10), and returns to step S2. The meter ECU 8 controls the indicator 9 in accordance with the command from the vehicle unit 3 to flash the warning lamp.

If the IG is switched from ON to OFF (Y in step S2), the vehicle unit 3 transmits a sleep signal (step S11), and thereafter ends the processing.

Figure 5:
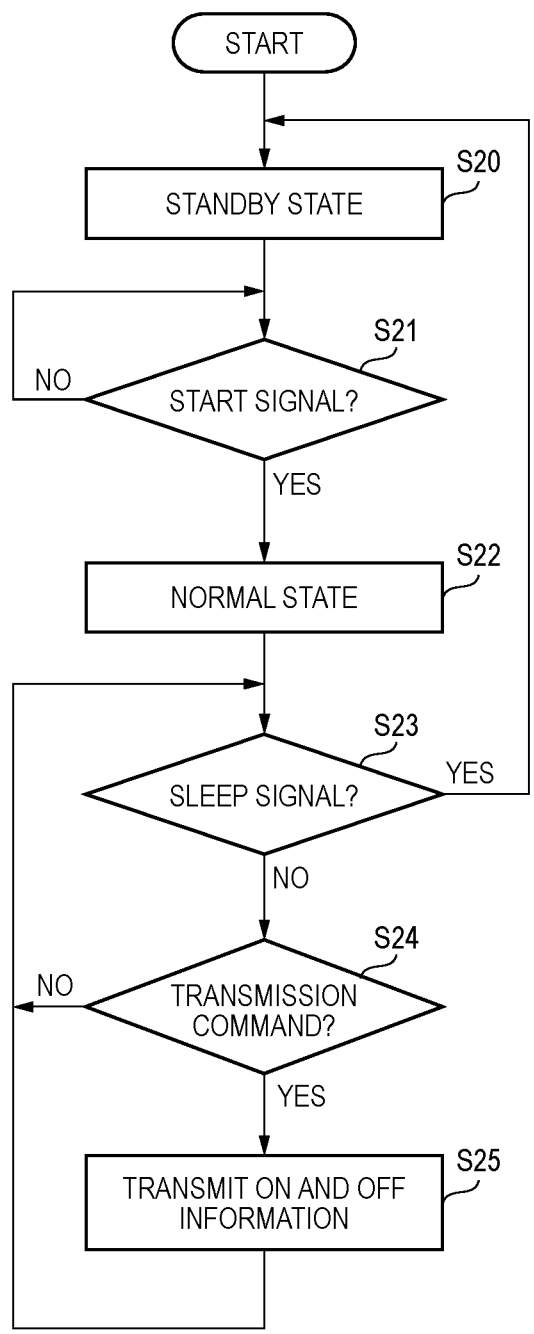
FIG. 5 is a flowchart illustrating a processing procedure of a control unit of a seat unit illustrated in FIG. 1 according to the first embodiment.

The control unit 22 of the seat unit 2 (hereinafter, also abbreviated as "seat unit 2") performs processing illustrated in FIG. 5 in response to power supply from the battery 21. First, the seat unit 2 switches to a standby state (step S20), and waits for reception of a start signal (step S21). Upon receiving a start signal (Y in step S21), the seat unit 2 is started and switched to a normal state (step S22).

Thereafter, upon receiving a transmission command from the vehicle unit 3 (Y in step S24) without receiving a sleep signal from the vehicle unit 3 step S23), the seat unit 2 acquires ON and OFF information on the switches SW1 and SW2 and transmits the ON and OFF information (step S25), and thereafter returns to step S23. On the other hand, while the transmission command from the vehicle unit 3 cannot be received (N in step S24), the seat unit 2 immediately returns to step S23. Upon receiving the sleep signal from the vehicle unit 3 (Y in step S23), the seat unit 2 returns to step S20, and is changed to the standby state to wait for reception of a start signal (step S21).

According to the communication system 1 and the seat unit 2 described above, only when the vehicle unit 3 has transmitted the start signal, the seat unit 2 switches from the standby state to the normal state and transmits ON and OFF information on the switches SW1 and SW2 mounted on the slide seat 4. Accordingly, battery life can be extended.

Second Embodiment

Next, a second embodiment will be described. According to the first embodiment described above, the seat unit 2 switches from a normal state to a standby state only when a sleep signal is transmitted from a vehicle unit 3 side, and the present disclosure is not limited thereto. The seat unit 2 may transmit the ON and OFF information after entering the normal state, and thereafter spontaneously return to the standby state. In the first embodiment, the seat unit 2 transmits the ON and OFF information only when having received an ON and OFF information transmission command from the vehicle unit 3. In the second embodiment, the seat unit 2 may acquire the ON and OFF information regularly during the standby state, and transmit an ON and OFF state to the vehicle unit 3 only when there is change in the ON and OFF information.

Figure 6:
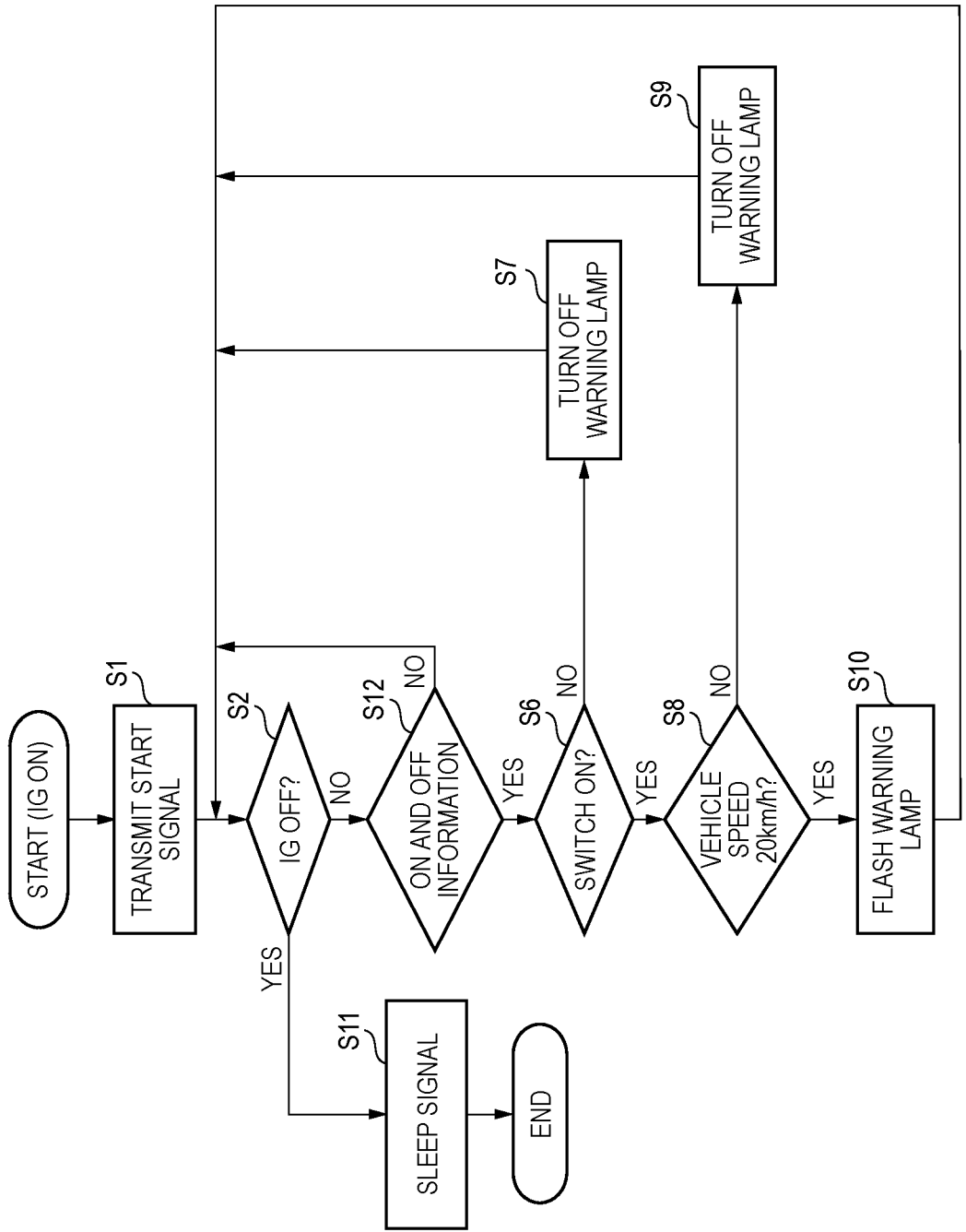
FIG. 6 is a flowchart illustrating a processing procedure of the control unit of the vehicle unit illustrated in FIG. 1 according to a second embodiment.
Figure 7:
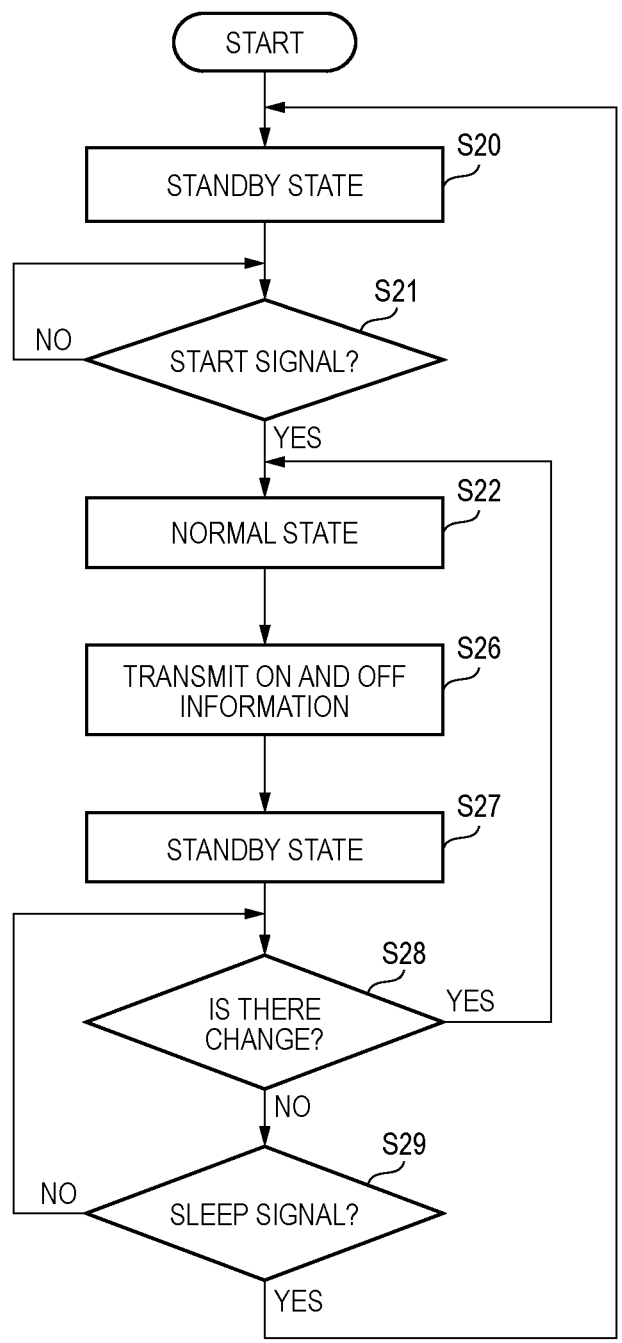
FIG. 7 is a flowchart illustrating a processing procedure of the control unit of the seat unit illustrated in FIG. 1 according to the second embodiment.

Specific operations of the second embodiment schematically described above will be described below with reference to flowcharts of FIGS. 6 and 7. In FIGS. 6 and 7, steps same as those already described in the first embodiment described above with reference to FIGS. 4 and 5 are denoted by the same reference numerals, and a detailed description thereof will be omitted.

Similarly to the first embodiment, when an IG switch is switched from OFF to ON, the vehicle unit 3 performs processing illustrated in FIG. 6 and performs steps S1 and S2. Thereafter, the vehicle unit 3 waits for reception of the ON and OFF information from the seat unit 2 (step S12). While the ON and OFF information cannot be received (N in step S12), the vehicle unit 3 returns to step S2. If the ON and OFF information can be received (V in step S12), the vehicle unit 3 performs steps S6 to S10 similarly to the first embodiment.

On the other hand, similarly to the first embodiment, the seat unit 2 performs processing illustrated in FIG. 7 in response to power supply of the battery 21, and performs steps S20 to S22. Thereafter, the vehicle unit 3 acquires the ON and OFF information on the switches SW1 and SW2, transmits the ON and OFF information (step S26), and thereafter spontaneously returns to the standby state (step S27). The vehicle unit 3 monitors the ON and OFF information in the standby state. If there is change in the ON and OFF information (Y in step S28), the vehicle unit 3 proceeds to step S22 to switch to the normal state, and then to S26 to transmit the ON and OFF information acquired in step S28.

On the other hand, if there is no change in the ON and OFF information (N in step S28), the seat unit 2 determines whether a sleep signal has been received from the vehicle unit 3 (step S29). If the sleep signal has not been received (step S29), the seat unit 2 returns to step S28 again. On the other hand, when the sleep signal is received (step S29), the seat unit 2 returns to step S21 and enters a standby state for a start signal.

According to the communication system 1 of the second embodiment described above, the seat unit 2 spontaneously switches to the standby state after transmitting the ON and OFF information. Accordingly, the battery life can be further extended.

According to the communication system 1 of the second embodiment described above, the seat unit 2 transmits the ON and OFF information only when the ON and OFF information has changed. Accordingly, it is possible to transmit necessary information to the vehicle unit 3 while extending the battery life.

Third Embodiment

Next, a third embodiment will be described. With respect to optical communication between the seat unit 2 and the vehicle unit 3, communication performance may decrease due to influence of adherence of a large amount of grease applied to the rail 6 to the light emitting unit 23, disturbance light or the like.

Therefore, in the third embodiment, when reception of an optical pulse signal indicating ON and OFF information from the seat unit 2 fails, the vehicle unit 3 transmits an output change command, which is for increasing output of the optical pulse signal, to the seat unit 2. The seat unit 2 outputs an optical pulse signal whose output is increased in response to reception of the output change command, thereby preventing a decrease in communication performance.

Figure 8A:
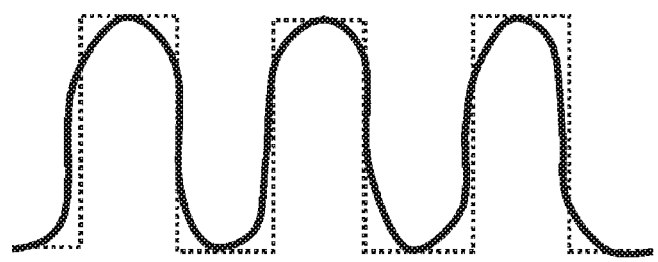
FIG. 8A is a time chart illustrating a waveform of an optical pulse signal received when communication performance is not poor.
Figure 8B:
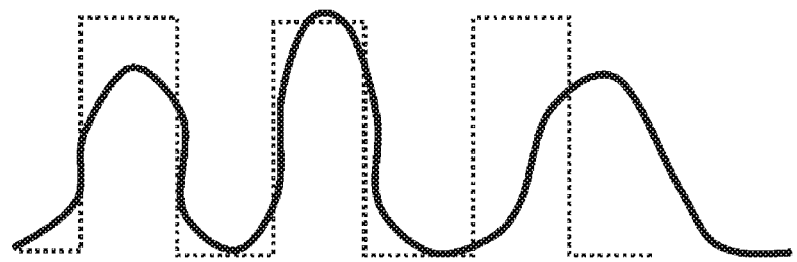
FIG. 8B is a time chart illustrating a waveform of an optical pulse signal received when the communication performance is poor.

Whether reception of an optical pulse signal has failed can be determined as follows. When the communication performance is not poor, as illustrated in FIG. 8A, optical pulse signals that have substantially the same amplitude and rising of waveform can be received. On the other hand, when the communication performance is poor, as illustrated in FIG. 8B, optical pulse signals that vary in the amplitude and rising of waveform are received. It is difficult to read accurate information from such optical pulse signals. Therefore, the vehicle unit 3 determines that the reception has failed when there is variation in amplitude and rising of the received optical pulse signals, and determines that the reception is successful when there is no variation.

Figure 9:
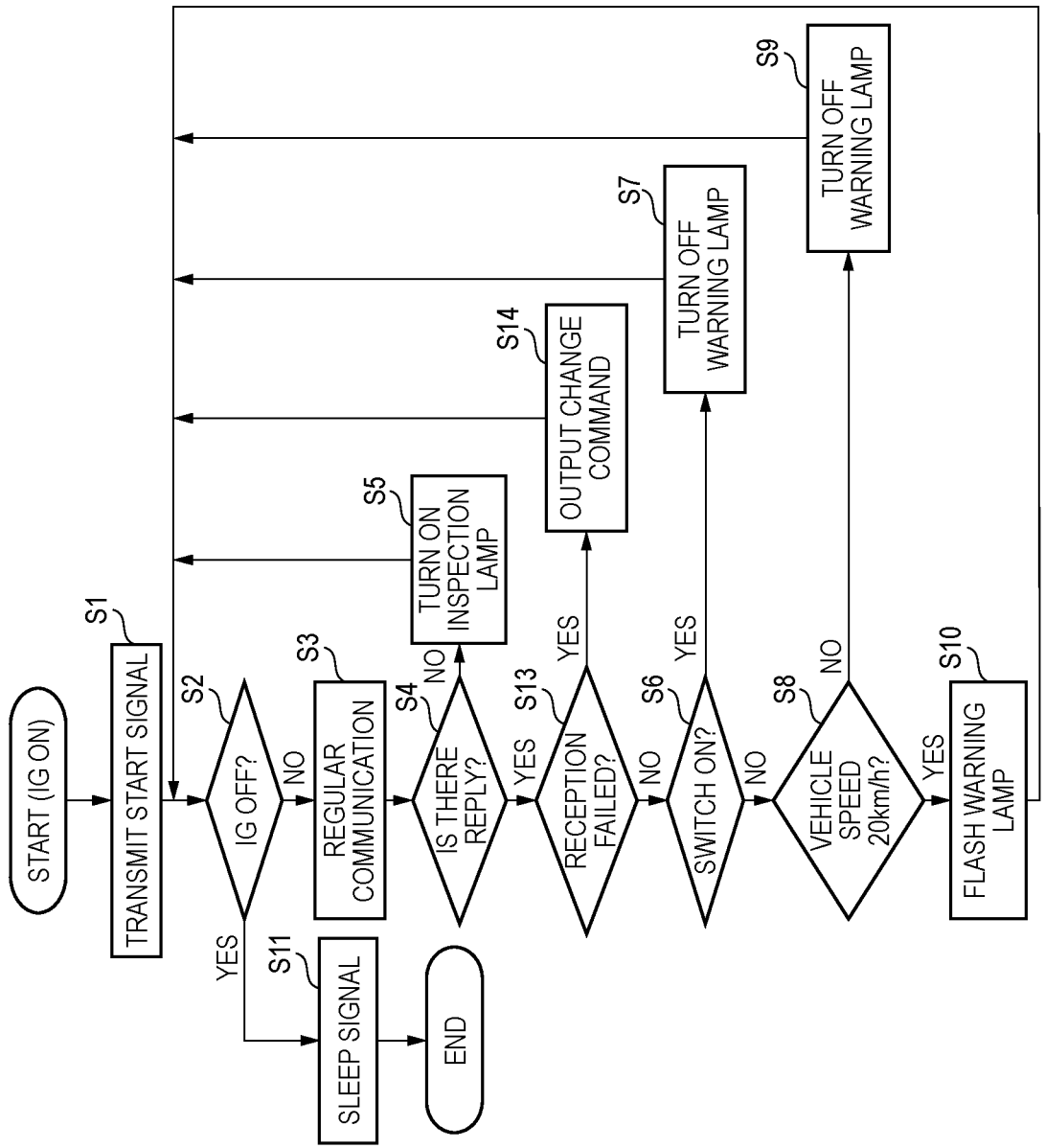
FIG. 9 is a flowchart illustrating a processing procedure of the control unit of the vehicle unit illustrated in FIG. 1 according to a third embodiment.
Figure 10:
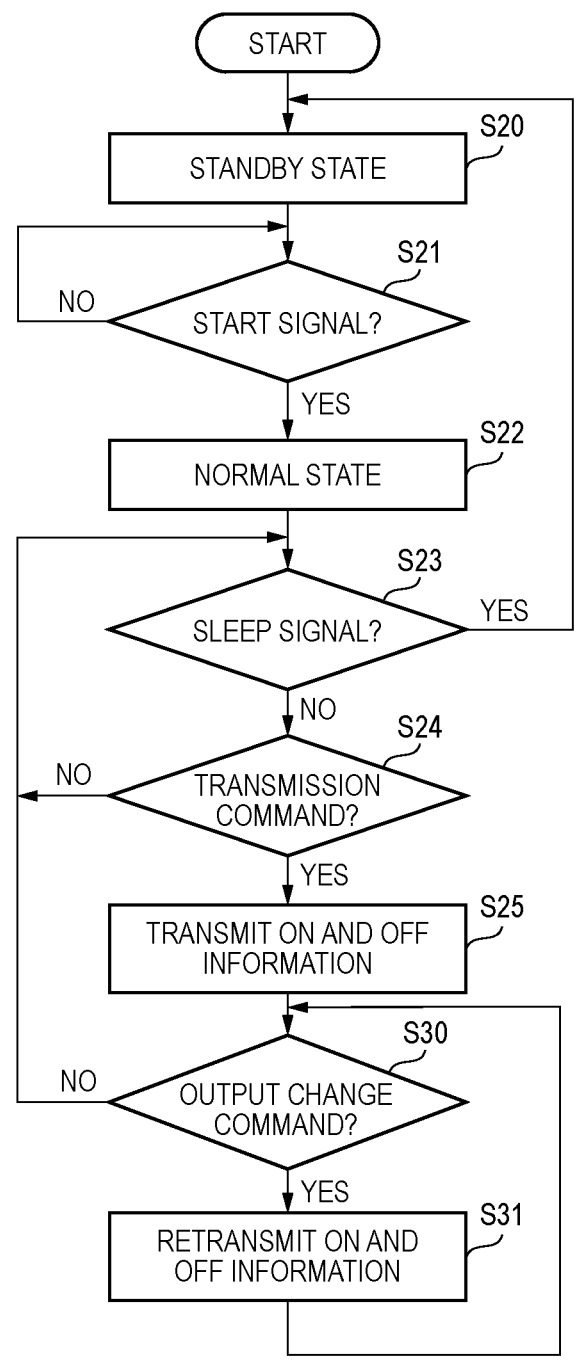
FIG. 10 is a flowchart illustrating a processing procedure of the control unit of the seat unit illustrated in FIG. 1 according to the third embodiment.

Specific operations of the third embodiment schematically described above will be described below with reference to flowcharts of FIGS. 9 and 10. In FIGS. 9 and 10, steps same as those already described in the first embodiment described above with reference to FIGS. 4 and 5 are denoted by the same reference numerals, and a detailed description thereof will be omitted.

Similarly to the first embodiment, when an IG switch is switched from OFF to ON, the vehicle unit 3 performs processing illustrated in FIG. 9 and performs steps S1 to S4. If it is determined in step S4 that there is a reply, the vehicle unit 3 determines whether reception of an optical pulse signal indicating ON and OFF information has failed (step S13) If the reception of the optical pulse signal has failed (Y in step S13), the vehicle unit 3 transmits an output change command (step S14), and returns to step S2. If the reception of the optical pulse signal has not failed (N in step S13), the vehicle unit 3 performs steps S6 to S10 similarly to the first embodiment.

On the other hand, similarly to the first embodiment, the seat unit 2 performs processing illustrated in FIG. 10 in response to power supply of the battery 21, and performs steps S20 to S25. Thereafter, upon receiving the output change command from the vehicle unit 3 (Y in step S30), the seat unit 2 increases output and retransmits an optical pulse signal indicating the ON and OFF information (step S31). If the output change command from the vehicle unit 3 is not received step S30), the seat unit 2 returns to step S23.

According to the communication system 1 of the third embodiment described above, when it is determined that the amplitude or rising of the optical pulse signals from the seat unit 2 varies, the vehicle unit 3 causes the output of the optical pulse signal to be changed. Accordingly, it is possible to reduce the influence from disturbance light and from the grease (foreign matter) adhered to the light emitting unit 23, thereby preventing a decrease in communication performance.

The present disclosure is not limited to the embodiment described above and may be appropriately modified, improved, or the like. In addition, the material, shape, size, number, arrangement position and the like of each component in the embodiment described above are optional and are not limited as long as the present disclosure can be achieved.

According to the embodiments described above, the seat unit 2 and the vehicle unit 3 perform optical wireless communication, and the present disclosure is not limited thereto. Wireless communication may be performed between the seat unit 2 and the vehicle unit 3, and wireless communication using radio waves or the like may be performed therebetween.

Further, according to the second embodiment, the seat unit 2 returns to the standby state spontaneously after transmitting the ON and OFF information in the normal state, and returns to the normal state to transmit the ON and OFF information when it is determined that there is change in the ON and OFF information in the standby state, and the present disclosure is not limited thereto. The seat unit 2 may maintain the normal state from when the start signal from the vehicle unit 3 is received to when the sleep signal is received, and may transmit the ON and OFF information when it is determined that there is change in the ON and OFF state in the normal state.

Figure 4:
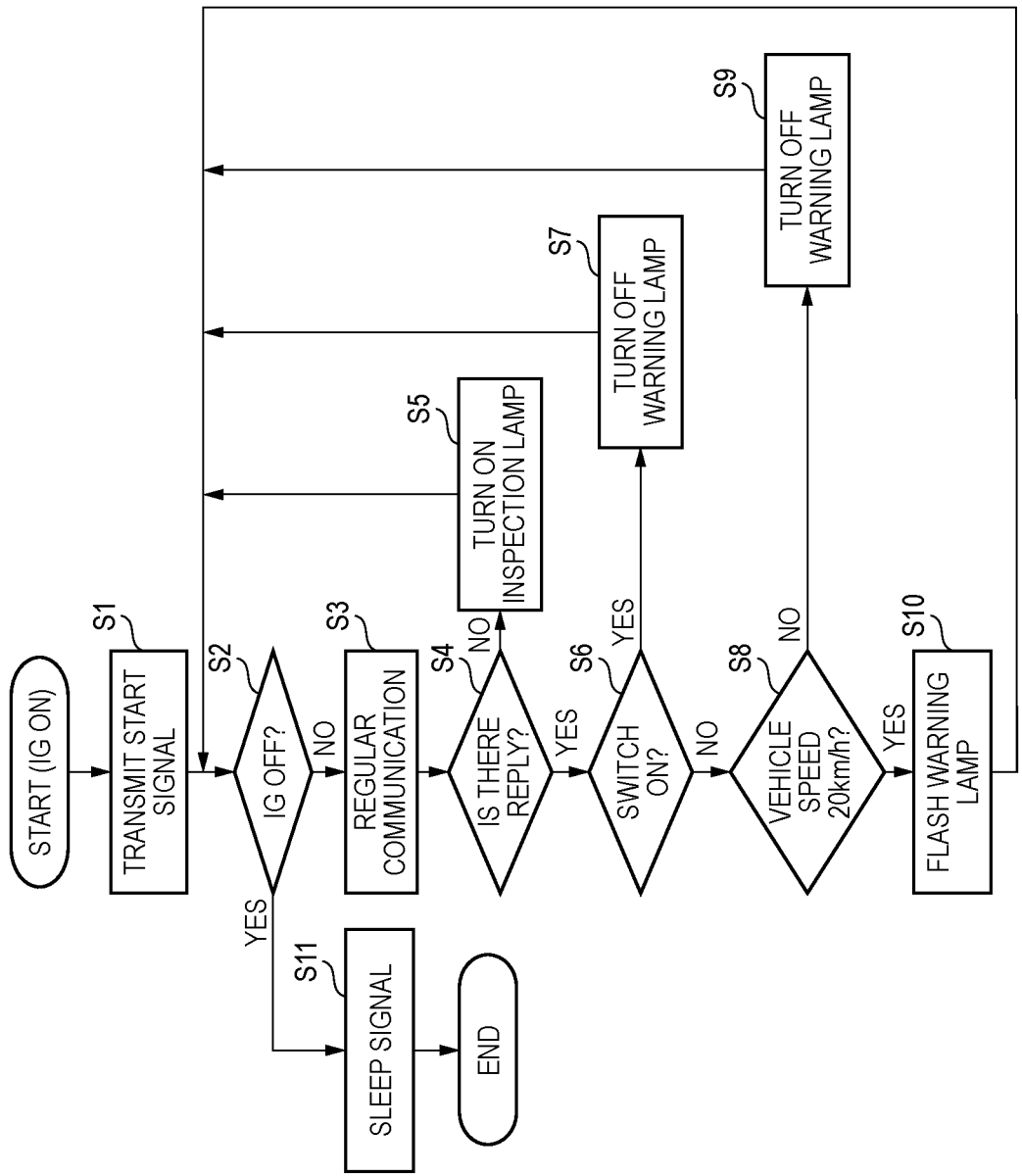
FIG. 4 is a flowchart illustrating a processing procedure of a control unit of a vehicle unit illustrated in FIG. 1 according to a first embodiment.

Further, according to the embodiment described above, at a timing when the IG switch is turned ON from being OFF, the vehicle unit 3 performs the processing illustrated in FIG. 4, and transmits the start signal, and the present disclosure is not limited thereto. At a timing when the IG switch is turned on and the vehicle speed is equal to or greater than 20 km/h, the vehicle unit 3 may perform the processing illustrated in FIG. 4 and transmit the start signal. In this case, if it is determined to be N in step S6, the vehicle unit 3 immediately proceeds to step S10 without performing the operations of steps S8 and S9 in FIG. 4.

Further, according to the embodiments described above, a primary battery is used as the battery 21, and the present disclosure is not limited thereto. A secondary battery may be used as the battery 21, and be charged by an electromotive force generated by light reception of the light receiving unit 24.

Illustrative aspects according to the present disclosure is described hereinafter. According to an illustrative aspect of the present disclosure, a communication system (1) includes a seat unit (2) that is mounted on a seat (4) of a vehicle and is configured to operate in response to an electrical power supplied from a battery (21), and a vehicle unit (3) that wirelessly communicates with the seat unit (2). The vehicle unit (3) transmits a start command. And, the seat unit (2) receives the start command in a standby state, the standby state being a state in which a power consumption is lower than a normal state, the normal state being a state in which the power consumption is higher than the standby state. The seat unit (2) switches from the standby state to the normal state, and transmits an information on an electronic device (SW1, SW2) mounted on the seat (4), in the normal state.

According to another illustrative aspect of the present disclosure, the seat unit (2) switches to the standby state after transmitting the information on the electronic device (SW1, SW2).

According to another illustrative aspect of the present disclosure, the seat unit (2) determines whether the information on the electronic device (SW1, SW2) changes in the standby state. The seat unit (2) switches to the normal state and transmits the information on the electronic device (SW1, SW2), when the seat unit determines that the information on the electronic device (SW1, SW2) changes.

According to another illustrative aspect of the present disclosure, the seat unit (2) determines whether the information on the electronic device (SW1, SW2) changes in the normal state. The seat unit (2) transmits the information on the electronic device (SW1, SW2) when the seat unit (2) determines that the information on the electronic device (SW1, SW2) changes.

According to another illustrative aspect of the present disclosure, the vehicle unit (3) transmits the start command, depending on whether an ignition turns on from an off-state of the ignition or turns off from an on-state of the ignition.

According to another illustrative aspect of the present disclosure, the seat unit (2) and the vehicle unit (3) wirelessly communicates with each other, such that an optical pulse signal is transmitted and received. The vehicle unit (3) transmits a change command for which an output of the optical pulse signal is adjusted, when the vehicle unit (3) determines that an amplitude or a rising of the optical pulse signal received from the seat unit (2) varies includes a dispersion of the amplitude or the rising. And, the seat (2) unit changes the output of the optical pulse signal and retransmits the changed optical pulse signal, when receiving the change command from the vehicle unit (3) after transmitting the optical pulse signal.

According to another illustrative aspect of the present disclosure, a seat unit (2) is mounted on a seat (4) of a vehicle, is configured to operate in response to an electrical power supplied from a battery (21), and wirelessly communicates with a vehicle unit (3). And, the seat unit (2) receives a start, command in a standby state, the standby state being a state in which a power consumption is lower than a normal state, the normal state being a state in which the power consumption is higher than the standby state. The seat unit (2) switches from the standby state to the normal state, and transmits an information on an electronic device (SW1, SW2) mounted on the seat (4), in the normal state.

What is claimed is:

1. A communication system, comprising:
a seat unit that is mounted on a seat of a vehicle and is configured to operate in response to an electrical power supplied from a battery; and
a vehicle unit that wirelessly communicates with the seat unit,
wherein the vehicle unit is configured to transmit a start command, and
wherein the seat unit is configured to:
receive the start command in a standby state, the standby state being a state in which a power consumption is lower than a normal state, the normal state being a state in which the power consumption is higher than the standby state;
switch from the standby state to the normal state;
transmit an information on an electronic device mounted on the seat, in the normal state;
switch to the standby state after transmitting the information on the electronic device;
determine whether the information on the electronic device changes in the standby state; and
switch to the normal state and then transmit the information on the electronic device, when the seat unit determines that the information on the electronic device changes.

2. The communication system according to claim 1, wherein the vehicle unit is configured to transmit the start command, depending on whether an ignition turns on from an off-state of the ignition or turns off from an on-state of the ignition.

3. The communication system according to claim 1, wherein the seat unit performs an optical wireless communication by transmitting and receiving an optical pulse signal to and from the vehicle unit, and
wherein a period of the optical pulse signal indicating the start command is longer than a period of the optical pulse signal indicating the information on the electronic device.

4. A communication system, comprising:
a seat unit that is mounted on a seat of a vehicle and is configured to operate in response to an electrical power supplied from a battery; and
a vehicle unit that wirelessly communicates with the seat unit,
wherein the vehicle unit is configured to transmit a start command, and
wherein the seat unit is configured to:
receive the start command in a standby state, the standby state being a state in which a power consumption is lower than a normal state, the normal state being a state in which the power consumption is higher than the standby state;
switch from the standby state to the normal state;
determine, in the normal state, whether or not to receive a transmission command via which the vehicle unit requests the seat unit to transmit an information on an electronic device mounted on the seat; and
transmit the information on the electronic device in the normal state, when the seat unit receives the transmission command.

5. The communication system according to claim 4, wherein the seat unit performs an optical wireless communication by transmitting and receiving an optical pulse signal to and from the vehicle unit, and wherein a period of the optical pulse signal indicating the start command is longer than a period of the optical pulse signal indicating the information on the electronic device.

6. A communication system, comprising:
a seat unit that is mounted on a seat of a vehicle and is configured to operate in response to an electrical power supplied from a battery; and
a vehicle unit that wirelessly communicates with the seat unit,
wherein the vehicle unit is configured to transmit a start command, and
wherein the seat unit is configured to:
    receive the start command in a standby state, the standby state being a state in which a power consumption is lower than a normal state, the normal state being a state in which the power consumption is higher than the standby state;
    switch from the standby state to the normal state; and
    transmit an information on an electronic device mounted on the seat, in the normal state,
wherein the seat unit and the vehicle unit wirelessly communicates with each other, such that an optical pulse signal is transmitted and received,
wherein the vehicle unit is configured to transmit a change command for which an output of the optical pulse signal is adjusted, when the vehicle unit determines that an amplitude or a rising of the optical pulse signal received from the seat unit includes a dispersion of the amplitude or the rising, and
wherein the seat unit is configured to change the output of the optical pulse signal and then retransmit the changed optical pulse signal, when receiving the change command from the vehicle unit after transmitting the optical pulse signal.

7. A seat unit that is mounted on a seat of a vehicle, is configured to operate in response to an electrical power supplied from a battery, and wirelessly communicates with a vehicle unit,
wherein the seat unit is configured to:
    receive a start command in a standby state, the standby state being a state in which a power consumption is lower than a normal state, the normal state being a state in which the power consumption is higher than the standby state;
    switch from the standby state to the normal state; and
    transmit an information on an electronic device mounted on the seat, in the normal state,
wherein the seat unit and the vehicle unit wirelessly communicates with each other, such that an optical pulse signal is transmitted and received,
wherein the vehicle unit is configured to transmit a change command for which an output of the optical pulse signal is adjusted, when the vehicle unit determines that an amplitude or a rising of the optical pulse signal received from the seat unit includes a dispersion of the amplitude or the rising, and
wherein the seat unit is configured to change the output of the optical pulse signal and then retransmit the changed optical pulse signal, when receiving the change command from the vehicle unit after transmitting the optical pulse signal.

* * * * *